United States Patent [19]

Tomasini et al.

[11] Patent Number: 5,459,787
[45] Date of Patent: Oct. 17, 1995

[54] CIRCUIT FOR THE IMPLEMENTATION OF AN IMPEDANCE FOR A TELEPHONE SPEECH CIRCUIT

[75] Inventors: Luciano Tomasini, Monza; Rinaldo Castello, Arcore; Pietro Erratico, Milan, all of Italy

[73] Assignee: SGS-Thomson Microelectronics S.r.l., Milan, Italy

[21] Appl. No.: 95,752

[22] Filed: Jul. 21, 1993

[30] Foreign Application Priority Data

Jul. 22, 1992 [EP] European Pat. Off. .............. 92830401

[51] Int. Cl.⁶ ..................................................... H04B 1/58
[52] U.S. Cl. .......................... 379/398; 379/402; 379/403; 379/414; 379/416
[58] Field of Search .................................... 379/398, 402, 379/403, 404, 405, 406, 414, 416

[56] References Cited

U.S. PATENT DOCUMENTS

| 4,558,185 | 12/1985 | Morikawa et al. ...................... 179/170 |
| 4,567,331 | 1/1986 | Martin ..................................... 179/170 |

FOREIGN PATENT DOCUMENTS

0434950A2  11/1990  European Pat. Off. .
0165231    6/1989   Japan ................................. 379/398

OTHER PUBLICATIONS

Patent Abstracts of Japan, vol. 14, No. 387 (E–967) Aug. 21, 1990.
Electrical Design News, vol. 31, No. 9, May 1986.
IEEE Journal of Solid–State Circuits, vol. 26, No. 7, Jul. 1991.

Primary Examiner—James L. Dwyer
Assistant Examiner—Jacques M. Saint-Surin
Attorney, Agent, or Firm—David V. Carlson; Clarence T. Tegreene; Seed and Berry

[57] ABSTRACT

A circuit for synthesizing an impedance associated with a telephone subscriber's circuit connected to a two-wire telephone line is described. The circuit of the invention is adapted to synthesize a complex impedance which can function both as a termination impedance and a balance impedance. The termination impedance utilizes a positive feedback loop structure having a loop gain which is at all times less than unity. The circuit that implements both the termination and balance impedances with sidetone suppression is also described. Each of the embodiments is realizable with a single external component consisting of a resistor.

11 Claims, 2 Drawing Sheets

5,459,787

CIRCUIT FOR THE IMPLEMENTATION OF AN IMPEDANCE FOR A TELEPHONE SPEECH CIRCUIT

DESCRIPTION

1. Field of the Invention

This invention relates to a circuit for synthesizing an impedance associated with a telephone subscriber's circuit connected to a two-wire telephone line.

2. Background of the Invention

The field of application of this invention relates, in particular but not solely, to telephone speech circuits incorporated to telephone subscriber's appliances, and the description which follows will make reference to said field of application for simplicity of illustration. There exists a demand in that specific field of application for good accuracy in the provision of the input impedance value, also called termination impedance, of the telephone circuit. In fact, each telephone company sets a maximum value of so-called return loss on the telephone band, and this value imposes a predetermined maximum admissible value on the termination impedance. It should be also noted that a telephone speech circuit provides for conversion from two to four wires, and that the accuracy of this conversion is tied, in turn, to the accuracy in value of another impedance, called balance impedance, which may be different from the termination impedance.

The termination and balance impedances are currently provided by a complicated structure, external to the integrated telephone circuit, which employs, moreover, comparatively expensive precision components. In addition, the integrated circuit requires additional pins for making the various connections involved.

Since the inception of the first monolithically integrated, telephone speech circuit, dating perhaps back to an article "A Programmable Speech Circuit Suitable for Telephone Transducers", *IEEE Journal of Solid-State Circuits*, Vol. SC-17, No. 6, December 1982, continued efforts have been made to reduce the number of components external to the telephone circuit but incorporated in the telephone subscriber's handset. It can be appreciated that this would both make for lower costs and improved reliability. To that end, the prior art has already proposed a solution described, for instance, in an article "A software programmable CMOS telephone circuit", *IEEE Journal of Solid-State Circuits*, Vol. 7, July 1991, wherein reference is made to a telephone circuit provided with no less than six external components. This prior art approach provides for the termination and balance impedances to be implemented basically by a precision external resistor. This resistor is transformed into a complex impedance by means of a control circuit, internal of the integrated speech circuit, which is operated in accordance with an appropriate transfer function. However, additional external components are used with the aforesaid resistor, namely: two coupling capacitors, two transistors, one diode, and a second resistor.

It has been found, moreover, that the stability of the control loop is dependent on the impedance value of the telephone line, and that the circuit may become unstable at high values of this impedance. Another disadvantage of the prior approach is that, for the impedance synthesis, integrated filters are required which must be calibrated individually to compensate for any variations originating from the production process.

SUMMARY OF THE INVENTION

The underlying technical problem of this invention is to provide an impedance synthesizing circuit which has such structural and functional characteristics as to overcome the above-mentioned disadvantages of the prior art. This problem is solved by a circuit as indicated above and defined in the characterizing portion of the appended claims. The features and advantages of a circuit according to the invention will become apparent from the following detailed description of an embodiment thereof, to be taken by way of non-limitative example in conjunction with the accompanying drawings.

DETAILED DESCRIPTION OF THE INVENTION

Figure 1:
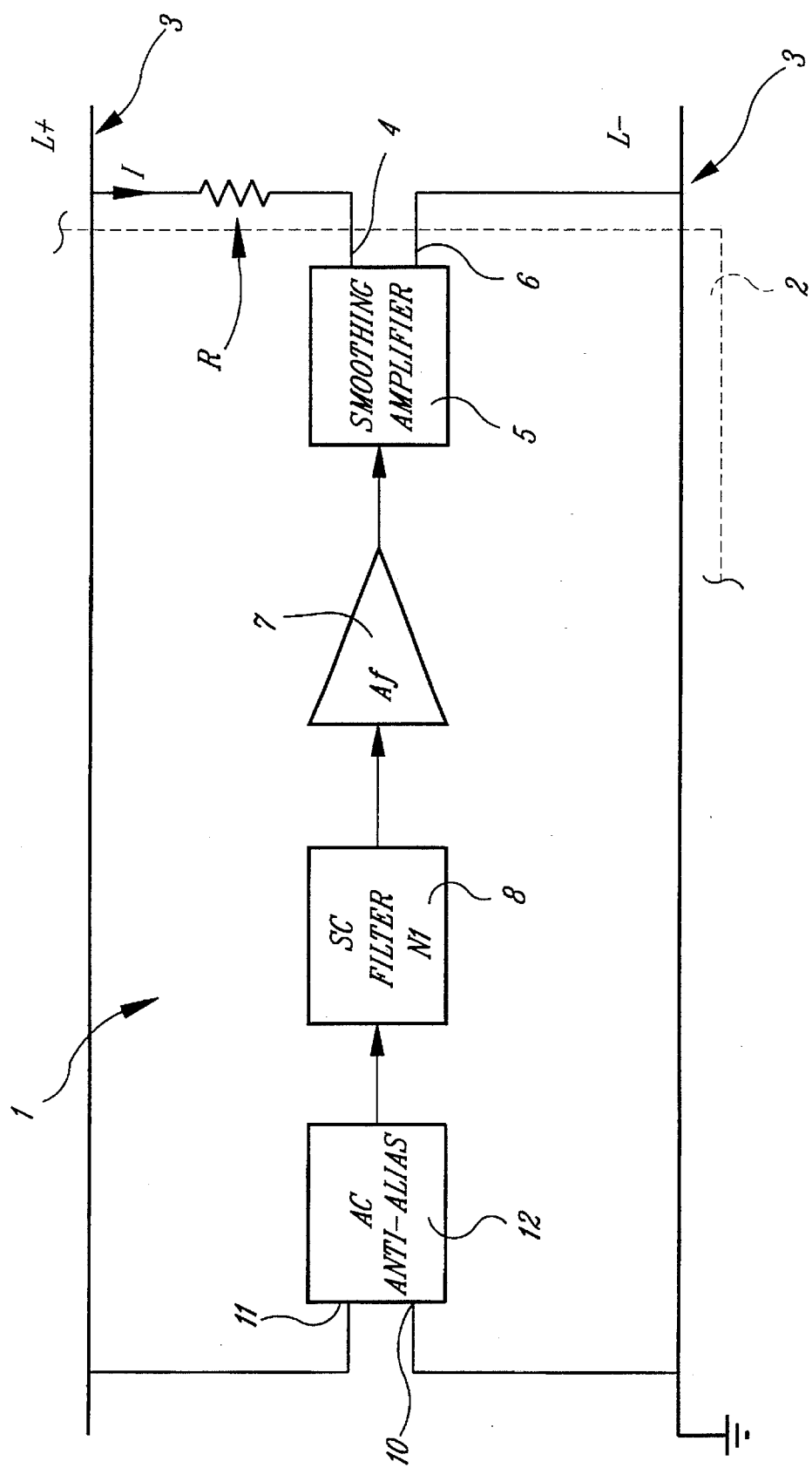
FIG. 1 is a diagrammatic representation of a circuit for synthesizing a termination impedance, according to the invention.

With reference to the drawing figures, generally and schematically shown at 1 is a circuit embodying this invention for synthesizing an impedance associated with a telephone speech circuit 2. More particularly, the circuit of this invention is adapted to synthesize a complex impedance which can function both as a termination impedance and a balance impedance.

The telephone circuit 2 is a monolithically integrated type connected to a two-wire telephone subscriber's line having a pair of terminals L+ and L−. It will be assumed later in this description that the first of said terminals, designated L+, is the telephone signal receiving terminal, and the other terminal, L−, represents a signal reference.

Conveniently, the circuit 1 of this invention is a positive feedback loop structure, at the first terminal L+ of the line 3, and comprises a single precision resistor R connected serially to the line and having one end connected to said first terminal L+. The circuit 1 further comprises a first filter 12 having a first input 11 which is connected directly to the line terminal L+ and receives the telephone signal present on the line 3. This filter 12 is essentially a capacitive coupler, and has a second input 10 connected to the other line terminal L−. Filter 12 comprises an internal antialias filter effective to remove high-frequency signals and avoid intermodulation noise of the signals being input to the circuit 1.

A second, zero-pole filter 8 is provided after the filter 12 which is connected centrally in the circuit 1 and has an output connected to the input of an amplifier 7 whose gain can be adjusted to suit the subscriber's demands. In the preferred embodiment being discussed, the gain g of amplifier 7 has been selected to be 1.5. The second filter 8 preferably handles a sampled signal and is of a type known commercially as a switched capacitor. This filter type affords the required degree of accuracy for the impedance value, while involving no external calibration steps. In addition, such filters afford an adequate dynamic range for the power supply value (about 3 Volts) available to the telephone circuit 2.

The structure of circuit 1 further includes a filter/amplifier 5, connected after the amplifier 7 and having an output 4 connected to the other end of the precision resistor R. This output 4 is characterized by a very low impedance. Said filter/amplifier 5 is essentially a unit gain amplifier of the type referred to as driver/smoothing, that is, functioning as a low-pass filter as well as a driver for the resistor R. An input 6 of the filter/amplifier 5 is connected to the other line terminal L− to have the same signal reference as the first filter 12.

Advantageously, the feedback loop formed by the circuit 1 exhibits high stability resulting from the selection of a positive feedback associated with a loop gain which is at all times less than unity. This makes for a stable circuit irrespective of the value of the line impedance across the terminals L+ and L−. This eliminates the common difficulty of stabilization of such feedback loops. In the prior art, the stabilization of such a loop is made especially difficult by the presence of a highly variable line impedance. The circuit of this invention obviates this problem by having the line voltage-driven, that is, at a low impedance. All circuit components of this invention can be integrated onto a semiconductor chip in one embodiment, if desired; however, in an alternatively and presently preferred embodiment, all components are integrated onto a single monolithic chip except the precision resistor R. Integrated circuits acceptable for use as the capacitive coupler filter 12, the zero pole filter 8, amplifier 7 and unit gain amplifier 5, respectively, are well known in the art as individual circuits, but have not previously been assembled in this combination. Many different circuit configurations for the individual components are presently known; any acceptable individual circuit may be used for the respective components within the claimed invention.

The operation of the inventive circuit will now be described. When a voltage V is applied to the terminal L+ of the line 3, the voltage Vr which appears across the resistance R is given by the following relation:

$$Vr = V * (1 - H(s))$$

where, H(s) is the transfer function from the input 11 of filter 12 to the output 4 of filter/amplifier 5.

Accordingly, denoting by I=Vr/R the current draw of the resistor R, it can be shown from the above relation that:

$$I = Vr/R = V * [(1 - H(s))]/R$$

Now, since the input 11 of circuit 1 has a high impedance, the current I can be taken with good approximation to be the overall current draw of the speech circuit 2 in response to a voltage signal V. It follows that the termination impedance Z1 of the circuit across the line 3 will be $$Z1 = V/I = R/[1 - H(s)].$$

If the transfer function H(s) varies with the frequency of the telephone band, then it can be inferred that the resultant impedance across the terminals L+ and L− is a complex impedance, even if it has been generated by a single discrete component consisting of the resistor R. This complex impedance does meet the applicable standards from the administrations of telephone companies. In addition, the termination impedance value may be changed as required by acting on the form of the transfer function of filter 8 and/or the gain of amplifier 7. The advantage over the prior art remains that all circuit elements may be implemented from known circuits on an integrated semiconductor chip; usually the precision resistor R is not on the chip, however.

Where needed, the circuit 1 may be provided with an external read-only memory, e.g. of the EPROM type, wherein various transfer function forms of the filter 8 can be stored. Likewise, the filter 8 could be "programmed" through a serial bus under control by a microprocessor.

Now, with reference to the example in FIG. 2, a further embodiment of the inventive circuit will be explained wherein individual and cooperating parts which are similar in construction and operation to the previous embodiment parts are denoted by the same reference numerals. In this second embodiment, conversion from two to four wires is provided to suit specific requirements of the received echo.

Figure 2:
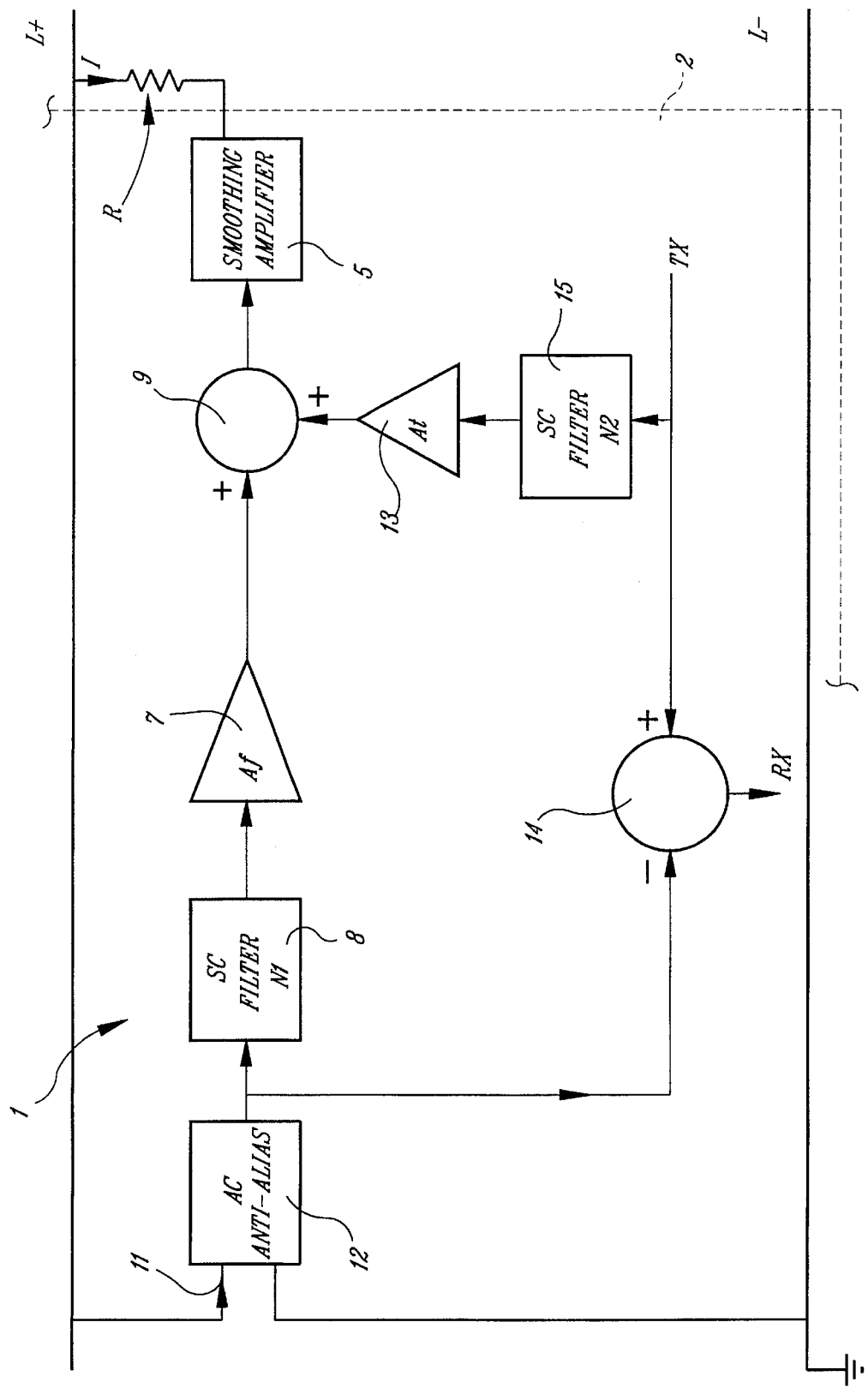
FIG. 2 is a diagrammatic representation of a second circuit for synthesizing both a termination and a balance impedance, according to the invention.

FIG. 2 shows diagrammatically the circuitry that implements both the termination and the two-to-four wire conversion with balance and sidetone suppression. A summing node 9 is connected between the amplifier 7 and the filter/amplifier 5 to receive both the signal from the amplifier 7 and a second, outgoing signal from another amplifier 13, in this case a unit gain one. The last-named amplifier, 13, is connected after a second filter 15 of the switched capacitor type. The second filter 15 and amplifier 13 are designed to supply a precise gain and a flat frequency response within the telephone band of interest and in the presence of a nominal line impedance across the terminals L+ and L−.

A second circuit node 14 which performs a subtraction function receives, at one end, a signal TX which is also input to the second filter 15. The receive signal picked up after the filter 12 is also input to the second circuit node 14. TX is the signal to be transmitted following appropriate amplification.

When, and only when, the nominal impedance is coincident with the balance impedance, sidetone suppression can be effected quite simply by subtracting the receive signal from signal TX at the node 14. The receive signal might require scaling through an amplifier. Circuits that can perform the individual functions of adder node 9, subtraction node 14, filter 15, and amplifier 13, respectively, are, again, known generally in the prior art. The result of this subtraction is represented by a signal RX shown in FIG. 2.

As with the embodiment of FIG. 1, the required termination and balance impedances for the two-to-four wire conversion are implemented by a single external precision component, still consisting of the resistor R. All other components are formed from circuits on an integrated semiconductor circuit, preferably monolithic but alternatively on different chips. It is only where, during the transmission step, the balance impedance differs from the line impedance rating that an additional switched capacitor type of filter ought to be used between the filter 12 output and the subtract node 14 input. It should also be noted that the filter 12, in addition to filtering out any noise from the line exceeding 80 kHz, will uncouple the impedance control loop at frequencies below 5 kHz. This uncoupling is necessary to hold the DC duty point fixed of the blocks which make up the control loop, regardless of the line length which defines said DC duty point.

The circuit of this invention does solve, in its various embodiments, the technical problem and affords a number of advantages, outstanding among which is the use of a single external component of a discrete kind, i.e., the resistor R. Not to be neglected are then the advantages arising from stability, ensured irrespective of the line load value, and precision in synthesizing an impedance with no need for calibration. Finally, the high dynamic range afforded by the circuit adds to the beneficial features of the solution provided by this invention.

We claim:

1. A circuit for synthesizing an impedance associated with a telephone subscriber's circuit connected to a two-wire telephone line having a pair of terminals, comprising, within a positive feedback loop:

a single precision resistor connected serially to one terminal of the pair of terminals;

at least one switched capacitor sampling filter having an input connected to the one terminal of said line for receiving a telephone signal from said line;

an amplifier between said filter and said resistor; and a pair of additional filters, a first of the additional filters being connected in the feedback loop to receive a signal from the two-wire line and provide an output signal to the sampling filter in response thereto, the first additional filter being of a type to remove high frequency components from the telephone signal from the two-wire line, a second of the additional filters being a low-pass filter connected in the positive feedback loop to receive the signal from said switched capacitor filter.

2. A circuit according to claim 1 wherein the second additional filter is connected between said amplifier and said resistor and has an output terminal connected to one end of said resistor.

3. A circuit according to claim 1 wherein said second additional filter has an output terminal connected in feedback relationship to an input terminal of the first additional filter through a first one of the terminals of said two-wire line.

4. A circuit for synthesizing an impedance associated with a telephone subscriber's circuit connected to a two-wire telephone line having a pair of terminals, comprising, within a positive feedback loop:

a single precision resistor connected serially to one terminal of the pair of terminals;

at least one switched capacitor sampling filter having an input connected to the one terminal of said line for receiving a telephone signal from said line;

an amplifier between said filter and said resistor;

a summing node connected to receive an output signal from said amplifier;

a second amplifier having an output terminal connected to said summing node; and a second sampling filter, said second sampling filter being a zero-pole filter serially connected to the second amplifier, said second sampling filter further operable to receive at its input a signal for transmission.

5. A circuit according to claim 4, further comprising:

a subtracting node receiving, at one node input, said signal for transmission, and at a second node input, a signal from the input of said first sampling filter, said subtraction node operative to suppress any presence of echo.

6. A circuit for synthesizing a termination and balance impedance associated with a telephone subscriber's circuit connected to a two-wire telephone line, comprising, within a positive feedback loop:

a single precision resistor connected serially to a terminal of the line;

at least one zero-pole or low-pass filter having an input connected to said terminal and receiving a telephone signal;

an amplifier connected between said filter and said resistor;

a second amplifier serially connected to a second filter; and a summing node connected to the respective outputs of said amplifiers and to one end of said resistor.

7. A circuit according to claim 6, further comprising:

a sidetone suppression subtracting node connected, at a first terminal, to an input of said second filter and receiving a signal for transmission at the first terminal, said subtracting node connected at a second terminal to the input of said first filter.

8. An impedance circuit for use in association with a telephone comprising:

a first terminal connected to a first line of a two-wire telephone line;

a sampling filter of the switched capacitor type within a positive feedback loop having an input terminal and an output terminal, the input terminal being coupled to the first terminal;

a first amplifier having an amplifier input terminal and an amplifier output terminal, the amplifier input terminal being connected to the output terminal of the sampling filter;

a resistor coupled between the first terminal and the amplifier output terminal;

a second terminal connected to provide a reference to the sampling filter;

a first filter connected between the first terminal and the sampling filter input terminal for coupling the sampling filter to the first terminal; and a second filter connected between the amplifier output terminal and the resistor for coupling the first amplifier to the resistor wherein each of said first and second filters is connected to the second terminal for a signal reference such that both at the first and second filters have a common signal reference terminal.

9. An impedance circuit for use in association with a telephone comprising:

a first terminal connected to a first line of a two-wire telephone line;

a sampling filter of the switched capacitor type within a positive feedback loop having an input terminal and an output terminal, the input terminal being coupled to the first terminal;

a first amplifier having an amplifier input terminal and an amplifier output terminal, the amplifier input terminal being connected to the output terminal of the sampling filter;

a resistor coupled between the first terminal and the amplifier output terminal;

a second terminal connected to provide a reference to the sampling filter;

a summing node having two input terminals and one output terminal, the first input terminal connected to the amplifier output terminal and the output terminal of the summing node connected to the resistor;

a second amplifier having its output connected to the second input terminal of the summing node;

a second sampling filter having its output connected to the second amplifier input and its input receiving a signal to be transmitted; and a subtracting node having a subtraction input terminal, an addition input terminal, and a signal output terminal, the subtracting input terminal connected to the input of the first sampling filter, the addition input connected to the input of the second sampling filter, the addition input receiving the signal to be transmitted.

10. The circuit of claim 9, further comprising two filters, the first of said filters connected between the first terminal and the first sampling filter input terminal and the second of said filters being connected between the amplifier output terminal and the resistor, each of said filters being referenced to the second terminal.

11. The circuit of claim 10 wherein the first amplifier has a gain of 1.5.

\* \* \* \* \*